Oct. 20, 1964     W. E. DUNN, JR     3,153,572
PROCESS FOR THE PRODUCTION OF NIOBIUM PENTACHLORIDE
Filed June 1, 1961
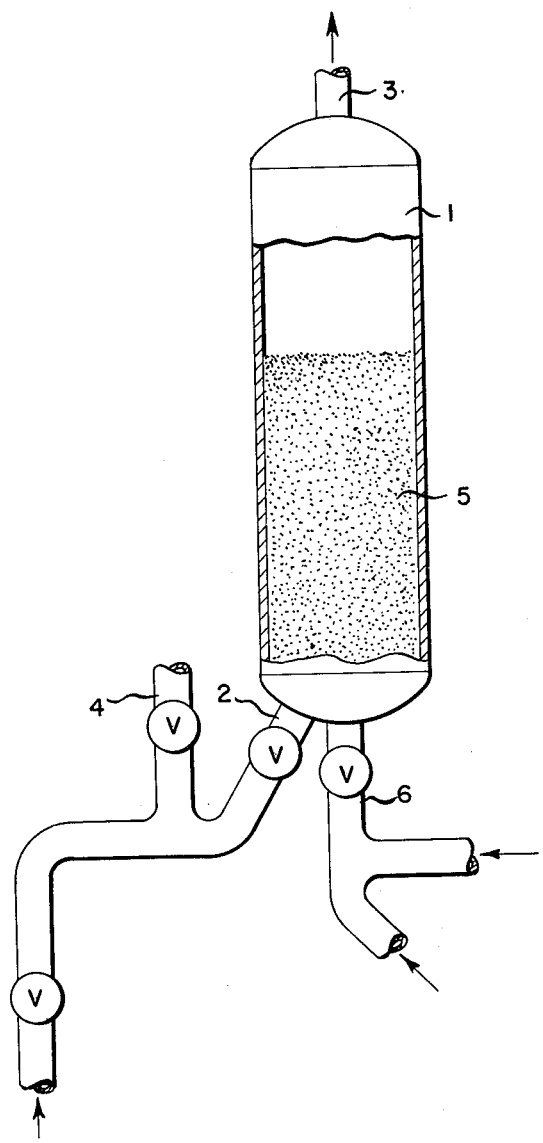
INVENTOR
WENDELL E. DUNN JR,
BY *Francis J. Crowley*
ATTORNEY

3,153,572
PROCESS FOR THE PRODUCTION OF NIOBIUM
PENTACHLORIDE
Wendell E. Dunn, Jr., Newark, Del., assignor to E. I.
du Pont de Nemours and Company, Wilmington, Del.,
a corporation of Delaware
Filed June 1, 1961, Ser. No. 114,081
16 Claims. (Cl. 23—87)

This invention relates to the production of niobium pentachloride. More specifically, it relates to an improved process by which niobium pentachloride of purity greater than 95% may be produced directly from raw materials comprising oxides of niobium.

The presently known methods by which niobium pentachloride is produced incorporate steps of reacting chlorine and carbon with oxidic ores containing niobium. These reactions have, in general, been carried out at temperatures in the range of 700–1000° C. and always under conditions such that the product is a mixture of niobium pentachloride and niobium oxychloride. When niobium pentachloride is to be used in the production of niobium by a reduction reaction, it must be extremely high purity if oxygen contamination of the resulting metal is to be avoided. Any method which will produce niobium pentachloride of a higher degree of purity is therefore of value. If such a process shows an economical advantage over the presently known and operated processes, it will be of even greater importance. The process of the present invention provides a method by which high-quality niobium pentachloride may be produced by a means more economical than has heretofore been possible.

The most straightforward reaction for the production of niobium pentachloride is the chlorination of oxidic ores of niobium using carbon as a reducing agent:

(1) $Nb_2O_5 + 4Cl_2 + 3C \rightarrow NbCl_5 + NbOCl_3 + 2CO + CO_2$

This reaction has been carried out by others at 700° C. or above. In spite of the apparent simplicity of the chemistry involved, the high temperature at which the reaction has been carried out has seriously complicated the operation. The choice of materials of construction is limited because of the corrosive nature of the reactants, corrosion which contaminates the product makes necessary additional apparatus for product purification, and costs are high due to the necessity for supplying large quantities of heat to sustain the reaction. More important even than these considerations is the fact that there is produced a mixture of pentachloride and oxychloride which must be carefully separated if the pentachloride product is to be used for preparation of high-purity niobium.

Conditions have now been found under which niobium-containing oxidic raw materials may be reacted with chlorine to produce a niobium product almost exclusively in the form of the pentachloride. Moreover, the process is carried out in a temperature range below that which was previously found possible. It has been found possible to carry out the process economically at temperatures from 300° C. to 650° C. The process may be carried out by fluidized bed operation, if this is desired.

The raw materials which are used commercially for the production of niobium chlorides are, for the most part, niobium-bearing ores which also contain appreciable quantities of such metals as manganese, calcium, iron, strontium, barium. These metals are readily chlorinated, and in many cases form chlorides whose melting points are within the temperature range at which the chlorination process has previously been carried out, i.e., 700–1000° C. The formation of these molten chlorides has made the operation of a fluidized bed very difficult, and in many instances actually impossible, because the temperatures required were above the melting points of the chlorides formed. Therefore, a process for the chlorination of niobium from niobium-bearing materials which can be carried out at a temperature below that at which many of these by-product chlorides become molten, is of great value, particularly when such operation can be carried out in a fluidized bed. Under the conditions disclosed in the present invention, such operation is possible with a resulting high yield of $NbCl_5$. The by-product chlorides of Mn, Ca, Ba, and Sr form as brittle flakes which, under attritive action of the bed particles, break into fine fragments and are carried out of the reactor by the gas stream. Separation of all of the by-product chlorides from the desired niobium pentachloride product can easily be achieved by well-known separation methods.

The attached drawing is a schematic diagram of an apparatus which can be used to carry out the invention.

The objects of this invention are attained by a process which comprises bringing together within a closed reaction zone at temperatures ranging from 300° C. to 650° C. niobium-bearing oxidic material, activated carbon, and a gas comprising chlorine, under conditions such that any intermediate niobium-chlorine containing products of the reaction are in turn further reduced and chlorinated within the same reaction zone, to give $NbCl_5$ almost exclusively as the final niobium-containing product. The gas feed to the reactor may also comprise a carbon-containing gas which will act as a reducing agent to replace or supplement the portion of carbon of the fluidized bed which would otherwise be consumed in the reaction.

A preferred method of operation is to charge into a closed reactor a bed of activated (very high surface area) carbon. In order to be sufficiently reactive, this carbon should be of a natural cellulosic origin, such as wood or nut charcoal. This bed is fluidized, preferably by means of an inert gas flow, while the temperature of the bed is being raised to the operating temperature. When the desired temperature within the range of 300° C.–650° C. has been reached, feed of niobium-bearing oxide, preferably niobium-bearing ore, is introduced into the fluidized carbon bed, and the inert gas feed is replaced by a gas comprising chlorine. In this case, one reaction which takes place for the chlorination of the niobium values will be (2) $Nb_2O_5 + 3C + 5Cl_2 \rightarrow 2NbCl_5 + CO + 2CO_2$ In an alternative method of operation, the reactant gas may contain carbon monoxide also, which will act either to supplement or to replace carbon as the reducing agent in the reaction. In this case the additional reaction (3) $Nb_2O_5 + 2\frac{1}{2}C + 5Cl_2 \rightarrow 2NbCl_5 + 2\frac{1}{2}CO_2$ will take place.

Still another method of operation is to feed phosgene gas in place of the separate reactant gases of carbon monoxide and chlorine. The reaction in this case would be (4) $Nb_2O_5 + 5COCl_2 \rightarrow 2NbCl_5 + 5CO_2$ A possible method of operation is to feed the reactant gases (either carbon monoxide and chlorine separately or combined in the form of phosgene) in sufficient quantity that the CO component will act as the sole reducing agent replacing the carbon of the fluidized bed in this capacity.

It is desirable, in order to obtain high yields of pentachloride product, to feed additional chlorine above the stoichiometric requirements in these reactions. An excess of from 10% to 50% based on the stoichiometric amount required to react with all the chlorinatable values in the ore has been found adequate.

In feeding the reactor, it has been found that the ore is most advantageously fed into the reactor in such manner that the niobium oxide is kept out of contact with the product NbCl$_5$. This is a necessary condition of operation because the reaction $$Nb_2O_5 + 3NbCl_5 \rightarrow 5NbOCl_3$$

is rapid and a contaminated product will result if conditions are such that the reaction may take place. This can be avoided by feeding the niobium oxide ore to the bottom of the reactor.

If an insufficient quantity of carbon monoxide is supplied to completely satisfy the stoichiometric demand according to Equation 3 above, the reaction will proceed at the expense of the carbon in the fluidized bed. One reaction which will take place will be:

(5)   $Nb_2O_5 + 5Cl_2 + CO + 2C \rightarrow 2NbCl_5 + 3CO_2$

All these alternative methods of operation are considered to be within the scope of the present invention, and the choice of procedure will depend on which method is found to be the most economical and convenient under the particular conditions prevailing.

The operation of this invention to produce NbCl$_5$ of high quality in good yield within the temperature range specified may be carried out in an apparatus of the type shown in the accompanying schematic drawing. There is shown a vertically disposed cylindrical type reactor 1. This may be composed of silica, high-silica brick, nickel, high nickel alloy or any other material which is of sufficient strength at the temperature specified, and sufficiently unreactive toward the feed materials, the attritive action of the fluidized bed, and the reaction by-products. The material which is preferred because of its non-reactivity as regards reactants and by-products, and because of its heat-transfer properties, is nickel, or an alloy of nickel. The reactor is provided with inlets 2, 4, and 6 and with outlet 3. Suitable furnacing means (not shown), electrical or otherwise, is associated with the reactor to externally heat and maintain the reactor at any desired temperature. Inlet 6 is connected with a source of supply of niobium-bearing ore to be chlorinated and with gas feed lines. The ore feed may thus be conveyed to the reactor by means of inert gas, or may be carried into the reactor by means of the flow of the reactant gases or air. The carbon bed which is fluidized by the upward flow of gases through inlets 2 and 6, is indicated as 5.

The gas velocity at which it has been found convenient to operate the fluidized bed has been found to be between 0.3 and 0.5 linear ft./sec., but these limits may be broadened as operating conditions are varied. The upper limit will be that velocity just below which abrasion and blowover of bed material takes place to an undesirable extent, and the lower limit will be that velocity just above which the bed no longer is fluidized.

The niobium-bearing material which is to be chlorinated may be any niobium oxide or oxide-bearing ore, but a reasonably high-grade columbite or pyrochlore concentrate which will be 50% to 60% or more Nb$_2$O$_5$ is preferred. These feed materials are of a refractory character and non-volatile at temperatures up to 1000° C. or higher. Although the presence of large amounts of high-boiling chloride formers such as manganese, calcium, strontium, barium, etc. is undesirable, an advantage that has already been stated for the present invention is that, when such metals are present, less stickiness of the fluidized bed results because the chlorination operation is carried out at lower temperatures than were previously possible. Larger percentages of these other chloride-forming metals in the ore feed can, therefore, be tolerated when the chlorination process is carried out according to the process of the present invention.

The ore which is used may vary in particle size from quite coarse particles to about 325 mesh size or even finer. The limitations on ore particle size are determined by mechanical rather than chemical criteria. Generally speaking, the ore may be as coarse as can be conveniently fed to the reactor, and not finer than can be retained in the reaction zone under the conditions of operation of the fluidized reactor bed. For practical operation, the major portion of the ore feed should be not coarser than 14 mesh size, nor finer than 325 mesh size. In order to avoid unnecessary consumption of chlorine (by the reaction $2Cl_2 + 2H_2O \rightarrow 4HCl + O_2$), it is preferred, but not required, that the ore feed be predried.

The particle size limitations which have been stated as applying to the ore feed are applicable also to the carbon to be used for the fluidized bed. As in the case of the ore to be chlorinated, the limitations on carbon particle size are set at the coarse end by the problem of feeding, and at the fine end by the problem of excessive blowover. The carbon which is used must have a high surface area (of the order of 500 m.$^2$/gm.), and must be a carbon of natural, cellulosic origin, e.g., wood or nut charcoal.

In order to more clearly illustrate the operation of the invention, the following examples are given. These methods of operation are for the purpose of illustration only, and not to be construed as in limitation of the invention.

*Example I*

A nickel alloy reactor tube ("Inconel": 78% Ni, 16% Cr, 6% Fe) 6" diameter and approximately 10' high fitted with inlet and outlet lines as shown in the diagrammatical drawing was charged with 30 pounds of high surface area activated wood charcoal commercially known as Norit C. The particle size was −14 to +60 mesh and the surface area was in excess of 1000 m.$^2$/g. By means of external heating, the temperature of the bed was raised to 510° C. at the same time that the bed was being fluidized by an upward flow of nitrogen at a rate of 2.0 cubic feet per minute (measured at standard conditions). When the temperature of the bed was 510° C., introduction of a mixture of ore, carbon, and chlorine was begun. The carbon and ore mixture was conveyed to the bed by a flow of nitrogen which was cut to 0.5 c.f.m., while at the same time a feed of chlorine was adjusted to a rate of 1.7 c.f.m. The ore which was used had been predried. It was Nigerian columbite which had been analyzed as follows:

Nb=50.0% (by weight)
Ta=3.8
Fe=12.03
Mn=2.72
Ti=0.45
Sn=0.45

94.5% of the ore was in the particle size range of −48 to +200 mesh.

Ore was fed to the reactor at the rate of 10#/hr. Carbon of the same type and particle size as used in the fluidized bed was fed at the rate of 2.5#/hr. The reaction was carried out for a 60-hour period. For the chlorination of niobium values, the process which takes place is that indicated as Reaction 2 above. The amount of chlorine which was fed was 40% excess over the stoichiometric amount required for chlorination of 600# of ore fed, calculating for reaction of all known chlorinatable constituents of the ore. At the conclusion of a 60-hour operating time during which the temperature was maintained at 510° C., 1025# of product chlorides comprising Nb, Ta and Fe chlorides had been collected from the reactor. Calculating on the basis of complete chlorination of Nb, Ta and Fe values in the ore, this represents a 96.5% yield on the ore fed. The Nb and Ta chlorides were separated from the FeCl$_3$. Analysis of the Nb-Ta chloride product showed it to be greater than 95% NbCl$_5$.

Example II

A nickel alloy reactor of the same type but somewhat larger than that used in Example I, 12" in diameter and approximately 11' high, was charged with 110 pounds of high surface area nut charcoal known commercially as Barneby Cheney PC-5 charcoal. The charcoal bed was fluidized by an upward flow of nitrogen at the rate of 2.0 cubic feet per minute and heated until a bed temperature of 500° C. was reached. In this example, the carbon bed was used solely for the purpose of supplying a catalytic surface upon which the chlorination of the niobium-bearing ore could take place. The reducing and chlorinating agents used were phosgene ($COCl_2$) and chlorine. The reaction of this example is therefore that given as Equation 4 above.

When an operating temperature of 500° C. had been reached, ore feed to the reactor was begun, and feed of 67.1 lb./hr. of $COCl_2$ and 12 lb./hr. $Cl_2$ replaced the nitrogen flow. The pre-dried ore was a portion of the same used in Example I. It was fed to the reactor at the rate of 38.1#/hr.

The chlorination of ore was continued for a 30-hour period during which time 2300 lbs. of chloride product were produced. During the operating time, this chloride product was periodically tested and was found in each case to be greater than 95% $NbCl_5$. The analysis of the carbon bed, following the termination of the run and the cooling of the reactor, showed that 30 pounds of chloride product had been absorbed by the carbon bed of the reactor.

Analyses of the off-gases from the reactor showed that the amount of chlorine fed was an excess of 13% over stoichiometric required for complete reaction of the chlorinatable values in the ore. Because some carbon is necessarily lost from the bed by attrition and blow-over, make-up carbon had to be fed during the run. This carbon amounted to a total of 10 lbs. over the 30-hour reaction period. It was added intermittently by a conveying gas stream of nitrogen at 0.5 c.f.m. (standard conditions).

Over a 30-hour reaction period, a total of 1143 lbs. of ore was fed to the reactor. Calculating on the basis of complete chlorination of the Nb, Ta, and Fe values in the ore, the product condensed from the reactor (2300 lbs.) and the adsorbed values in the carbon bed (30 lbs.) represents a yield of 93.5% on the Nb, Ta and Fe values in the ore.

Example III

A nickel alloy reactor 12" in diameter and 11' in height was charged with 110 pounds of high surface area carbon of a grade known commercially as "Norit C." The bed was fluidized by the upward flow of air at the rate of 1.0 cubic foot per minute and was heated to a temperature of 500° C. When this temperature was reached, feed of pyrochlore ore and of chlorine was begun to the reactor. The ore was fed at the rate of 27.8#/hr. during the entire operating period, and chlorine was fed at the rate of 66.25#/hr. During the period of operation, 27# of carbon of the same type and particle size used in the starting bed was fed to the reactor to maintain the original bed height. The carbon was conveyed to the bed by a feed of 1.0 cubic foot per minute of air.

The ore which was used in this run was pyrochlore which had been analyzed as follows:

Nb=37.25%
Ta=0.29%
Fe=2.37%
Ca=8.7%
Ti=5.5%
Zr=2.7%

The ore was of smaller particle size than in the case of Example I, 54.5% of the ore in this example being —200 mesh screen size.

The reaction was carried out for a period of 7¼ hours. The product collected from this run weighed 115 pounds. Analysis of the Nb-Ta chloride product showed it to be more than 95.5% $NbCl_5$.

Analysis of the off-gases from the reactor showed that the amount of chlorine fed was an excess of 20% over stoichiometric required for complete reaction of all of the chlorinatable values in the ore.

Example IV

This example will illustrate the operation of this invention in the chlorination of Nigerian columbite. The analysis of the ore used in this example was as follows:

Nb=46.9%
Ta=4.2%
Fe=14.4%
Mn=1.58%
Sn=1.47%
Ti=1.53%

This ore was of such particle size that 94.17% was —20+200 mesh size (U.S. Standard Sieve Scale).

The carbon used was Norit C, the same type as in the previous example. It was of —14+60 mesh particle size.

A reactor similar to that described in Example II was used, and 110# of carbon was charged to the reactor. This was fluidized by the upward flow of 1.0 cubic foot of air per minute, and the temperature of the bed was raised to 550° C. Feed of chlorine and ore was begun, the chlorine being fed at the rate of 83.5#/hr. and the ore being fed at the rate of 52.4#/hr. To keep the bed level at the original height, 9.37#/hr. of carbon was fed to the reactor by means of a flow of 1.0 cubic foot per minute of air.

The operation was continued for a period of 78 hours and 7006 pounds of good quality product were obtained. This represents a yield of 89.6% on the chlorinatable values in the ore fed. Analysis of the Nb-Ta chloride product showed it to be greater than 95% $NbCl_5$.

Example V

This example will illustrate the chlorination of pyrochlore at an operating temperature of 300–350° C. The ore which was used in this example was a portion of the same pyrochlore which was used in Example III. As in Example III, a reactor 12" x 11' was charged with 110 pounds of "Norit C." The bed was fluidized by the upward flow of air at the rate of 1.0 cubic foot per minute and was heated to a temperature of 300° C. A flow of chlorine to the reactor was begun at a rate of 12# per hour, and pyrochlore (55% of which was —200 particle size) at the rate of 5# per hour was conveyed to the reactor by means of the air flow. Almost immediately the beginning of reaction was indicated by a rise in temperature of the fluidized bed. In order to keep the temperature under control at 325–350° C., inert gas was substituted for the air feed. An inert gas flow of 6.5 cubic feet per minute was used to convey the ore and to control reactor temperature.

The operation was continued under these conditions for 10 hours. The $FeCl_3$ in the gaseous product was separated from the Nb and Ta chlorides by fractional condensation of the product gases from the reactor. At the conclusion of the run, 26# of chlorides comprising Nb and Ta had been obtained. This chloride product was analyzed and found to be more than 95% $NbCl_5$.

My study of the chlorination process herein described has shown that the rate of conversion of the niobium oxide species in the oxidic raw material to the pentachloride ($NbCl_5$) is as rapid at 500° C.–650° C. as it is at 900° C.–1000° C. Even at a temperature as low as 300° C., the rate of conversion to $NbCl_5$ is usefully high.

This unexpected result can be explained by consideration of the two reactions:

(6) 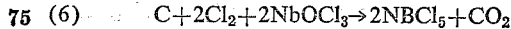 $C + 2Cl_2 + 2NbOCl_3 \rightarrow 2NbCl_5 + CO_2$ and (7) $\quad CO + Cl_2 + NbOCl_3 \rightarrow NbCl_5 + CO_2$ It has been found that these two reactions are kinetically independent of temperature as long as activated carbon (high surface area carbon) is present to provide surface upon which the reaction may take place. In the chlorination of ore, or of other niobium-bearing oxidic materials, the reaction (8) $\quad Nb_2O_5 + 2C + 3Cl_2 \rightarrow 2NbOCl_3 + CO + CO_2$ is slow and dependent upon temperature. In contrast to this, the reaction (9) $\quad 3NbCl_5 + Nb_2O_5 \rightarrow 5NbOCl_3$ is rapid and temperature independent within the range herein specified.

Although the entire chlorination process takes place in a complex manner, it is believed that the over-all chlorination reactions $$Nb_2O_5(ore) + 5Cl_2 + 3C \rightarrow 2NbCl_5 + CO + 2CO_2$$

and $$Nb_2O_5(ore) + 5CO + 5Cl_2 \rightarrow 2NbCl_5 + 5CO_2$$

probably proceed via Reaction 9 above. This reaction is followed by Reactions 6 and 7 above. Because Reaction 9 is rapid and temperature independent, this reaction is principally responsible for the breaking down of the ore, and is therefore the one which is chiefly responsible for the successful chlorination of columbium-containing ores according to the present invention.

Since it is obvious that many changes and modifications can be made in the above-described details without departing from the nature and spirit of the invention, it is to be understood that the invention is not to be limited to said details except as set forth in the appended claims.

The embodiments of the invention in which an exlusive property or privilege is claimed are defined as follows:

1. A process producing a niobium-containing product in which the niobium is present almost exclusively as niobium pentachloride by chlorinating, in a closed reactor, a particulate, oxidic ore containing niobium oxide and at least one other metal value from the group consisting of manganese, calcium, iron, strontium, and barium, which process comprises simultaneously feeding to a reactor said niobium oxide-bearing ore and a chlorinating gas selected from the group consisting of (1) chlorine, (2) phosgene, (3) a mixture of chlorine and carbon monoxide, (4) a mixture of chlorine and phosgene, and (5) a mixture of chlorine, phosgene and carbon monoxide, while maintaining within the reactor, at a temperature within the range of 300 to 650° C., a body of particulate, activated carbon prepared from a natural cellulosic product, the amount of chlorine introduced being equivalent to at least a stoichiometric amount to convert all of the chlorinatable metal values in the ore to oxygen-free metal chlorides and recovering niobium pentachloride product by removing it from the reactor at a point where it is not in contact with the niobium oxide-containing ore.

2. The process according to claim 1 in which chlorine is the chlorinating gas.

3. The process according to claim 1 in which a mixture of chlorine and carbon monoxide in the chlorinating gas.

4. The process according to claim 1 in which the phosgene is the chlorinating gas.

5. The process according to claim 1 in which the chlorinating gas is a mixture of chlorine, carbon monoxide, and phosgene.

6. A process producing a niobium-containing product in which the niobium is present almost exclusively as niobium pentachloride by chlorinating, in a closed reactor, a particulate, oxidic ore containing niobium oxide and at least one other metal value from the group consisting of manganese, calcium, iron, strontium, and barium, which process comprises simultaneously feeding to a reactor said niobium oxide-bearing ore and a chlorinating gas selected from the group consisting of (1) chlorine, (2) phosgene, (3) a mixture of chlorine and carbon monoxide, (4) a mixture of chlorine and phosgene and (5) a mixture of chlorine, phosgene and carbon monoxide, while maintaining within the reactor, at a temperature within the range of 300 to 650° C., a body of particulate, activated carbon prepared from a natural cellulosic product, the amount of chlorine introduced being equivalent to from 10% to 50% above the stoichiometric requirement to convert all of the chlorinatable metal values in the niobium ore to oxygen-free metal chlorides, and recovering niobium pentachloride product by removing it from the reactor at a point where it is not in contact with the niobium oxide-containing ore.

7. The process according to claim 6 in which chlorine is the chlorinating gas.

8. The process according to claim 6 in which a mixture of chlorine and carbon monoxide is the chlorinating gas.

9. The process according to claim 6 in which phosgene is the chlorinating gas.

10. The process according to claim 6 in which the chlorinating gas is a mixture of chlorine, carbon monoxide, and phosgene.

11. A process producing a niobium-containing product in which the niobium is present almost exclusively as niobium pentachloride by chlorinating, in a closed reactor, a particulate oxidic ore containing niobium oxide and at least one other metal value from the group consisting of manganese, calcium, iron, strontium, and barium, which process comprises simultaneously feeding to a reactor said niobium oxide-bearing ore and a chlorinating gas selected from the group consisting of (1) chlorine, (2) phosgene, (3) a mixture of chlorine and carbon monoxide, (4) a mixture of chlorine and phosgene, and (5) a mixture of chlorine, phosgene and carbon monoxide, carrying out the reaction in said reactor at a temperature within the range of 300 to 650° C. in which there is maintained a fluidized bed of particulate, activated carbon prepared from a natural cellulosic product, the amount of chlorine introduced being equivalent to at least a stoichiometric amount to convert all of the chlorinatable metal values in the ore to oxygen-free metal chlorides and the particles of said ore and carbon being small enough to pass a 14-mesh sieve but too large to pass a 325-mesh sieve, both sieves being U.S. Standard, and recovering niobium pentachloride product by removing it from the reactor at a point where it is not in contact with the niobium oxide-containing ore.

12. The process according to claim 11 in which chlorine is the chlorinating gas.

13. The process according to claim 11 in which the chlorinating gas is a mixture of chlorine and carbon monoxide.

14. The process according to claim 11 in which the chlorinating gas is phosgene.

15. The process according to claim 11 in which the chlorinating gas is a mixture of chlorine, carbon monoxide, and phosgene.

16. In a process for producing a niobium-containing product in which the niobium is present almost exclusively as niobium pentachloride of sufficiently high purity to be suitable for direct reduction to niobium metal, by chlorinating in a closed reactor a particulate oxidic ore containing niobium oxide and at least one other metal value selected from the group consisting of manganese, calcium, iron, strontium and barium, the steps comprising (1) passing a gas upwardly through particles of activated carbon prepared from a natural cellulosic product, the particles being small enough to pass a 14-mesh sieve but too large to pass a 325-mesh sieve, to form a fluidized bed of the particles, (2) maintaining the fluidized bed at a temperature within the range of 300 to 650° C. while feeding to the bottom thereof said particulate oxide ore, the ore particles being within the same size range as the carbon particles, (3) simultaneously feeding to the bed a chlorinating gas selected from the group consisting of (1) chlorine, (2) phosgene, (3) a mixture of chlorine and carbon monoxide, (4) a mixture of chlorine and phosgene, and (5) a mixture of chlorine, phosgene and carbon monoxide, the rate of feeding of said gas being sufficient to maintain in the reactor an amount of chlorine 10% to 50% above the stoichiometric requirement to convert to oxygen-free metal chlorides all of the chlorinatable metal values in the ore being fed to the reaction zone, and (4) recovering the niobium pentachloride product by removing it from the reactor at a point above that at which any niobium oxide is present.

References Cited in the file of this patent

UNITED STATES PATENTS

| | | |
|---|---|---|
| 1,509,605 | McKee | Sept. 23, 1924 |
| 1,544,328 | McAfee | June 30, 1925 |
| 1,843,355 | Behrman | Feb. 2, 1932 |
| 2,870,073 | Merlub-Sobel et al. | Jan. 20, 1959 |
| 2,969,852 | Jacobson | Jan. 31, 1961 |

FOREIGN PATENTS

| | | |
|---|---|---|
| 801,386 | Great Britain | Sept. 10, 1958 |

OTHER REFERENCES

Sue: Chemical Abstracts, volume 33, page 3714 (1939); original article in Comptes Rendus, volume 208, pages 814–16 (1939).

Urazov et al.: Chemical Abstracts, volume 31, page 4460 (1937).

Kipling: Article in Quarterly Reviews, volume 10, No. 1, pages 1–2, 9 (1956).

Spitsyn et al.: Chemical Abstracts, volume 35, page 2433 (1941).